Patented June 30, 1931

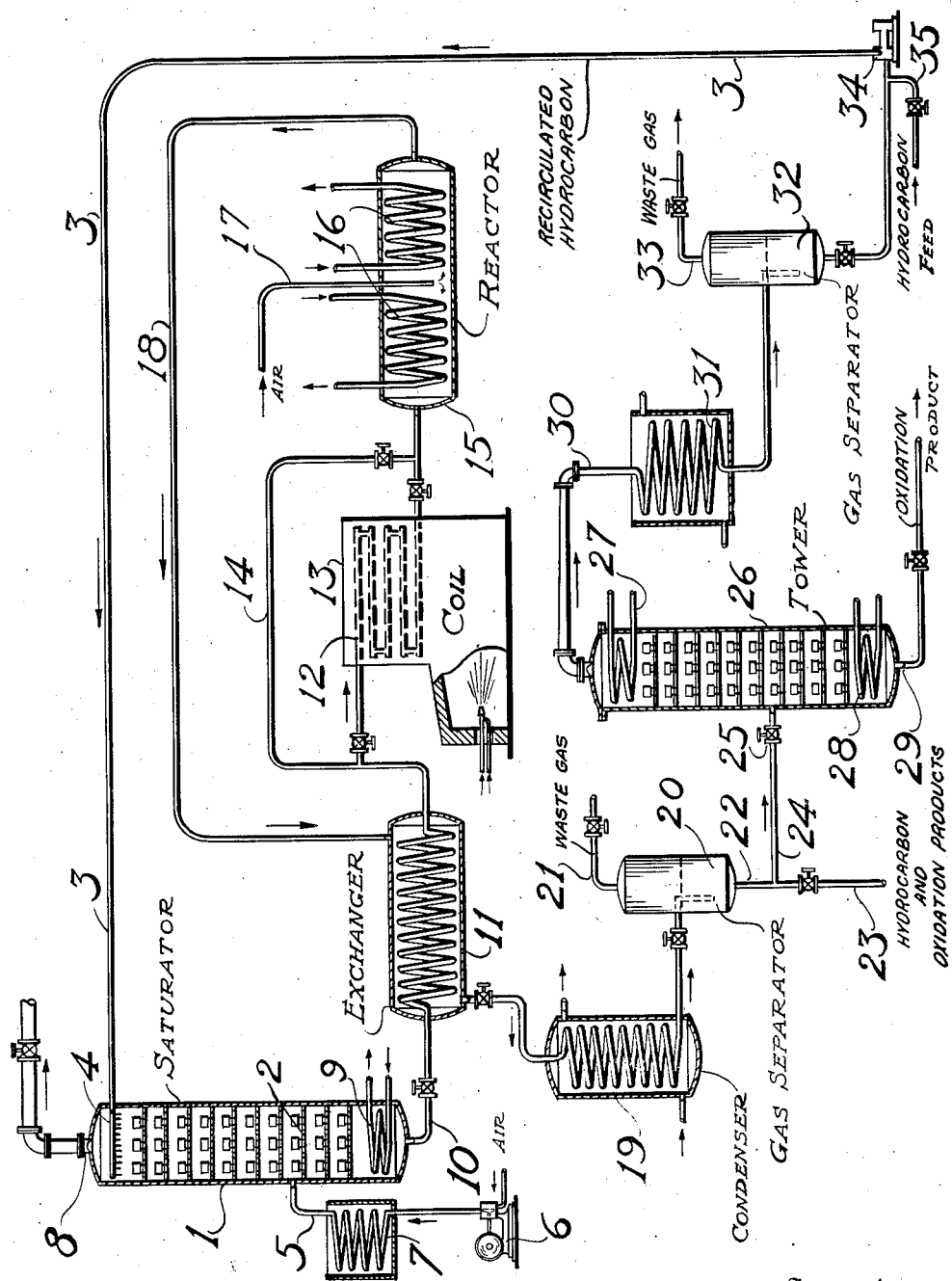

1,812,714

UNITED STATES PATENT OFFICE

JAMES W. PUGH, OF BRECKENRIDGE, TEXAS, AND ERNEST TAUCH AND THOMAS E. WARREN, OF CAMBRIDGE, MASSACHUSETTS, ASSIGNORS TO STANDARD OIL DEVELOPMENT COMPANY, A CORPORATION OF DELAWARE

METHOD FOR OXIDATION OF HYDROCARBONS

Application filed August 4, 1928. Serial No. 297,430.

The present invention relates to the art of oxidizing organic liquids and gases and more specifically comprises an improved process for obtaining valuable oxidation products from petroleum hydrocarbons and the like and will be fully understood from the following description and the drawing which illustrates an apparatus suitable for the process.

The drawing is a semi-diagrammatic view in sectional elevation of an apparatus adapted for the oxidation of hydrocarbons by our improved process and indicates the flow of materials.

A previous application, Serial No. 190,728, filed May 12, 1927 in the names of W. K. Lewis and P. K. Frolich, discloses a process for treating hydrocarbons with oxygen or air at high temperature and pressure for the formation of liquid oxygen-containing derivatives, among which a considerable proportion of alcohols are formed. The present invention comprises an improved method for carrying out the oxidation.

Referring to the drawing, reference character 1 designates a saturator, for example, in the form of a tower in which bell cap plates 2 are arranged to afford intimate contact of gas and liquid. Hydrocarbon to be oxidized is fed in liquid condition by a pipe 3 into the top of saturator 1 and is distributed by means of spray head 4. In flowing down to the base of the tower, the oil dissolves oxygen which is admitted by pipe 5 either as pure oxygen or as a gas rich in oxygen. The gas, preferably air, is compressed by compressor 6 and cooled in cooler 7 before admission to the saturator and enters preferably at a point between the upper and lower ends. Oxygen is dissolved in the oil in preference to nitrogen which may be withdrawn by pipe 8 from the top of the saturator, and if desired a heating coil 9 may be placed in the lower part of the saturator so as to make a more or less complete separation between oxygen and nitrogen, as will be understood.

The solution of oxygen in oil with a relatively small quantity of nitrogen is conducted by pipe 10 to a heat exchanger 11 for preheating and thence to a fired coil 12 arranged in a setting 13. The mixture or a part of it may be shunted around the coil 12 by a by-pass 14 and suitable valves are provided to direct the flow, as desired. The mixture then passes into and through a reactor 15 which may be of any suitable design, provided with temperature regulation coils 16, disposed and arranged for the passage of a heating or cooling fluid so that temperature in the reactor may be controlled. Additional air or oxygen-containing gas may be admitted to the reactor by pipe 17.

The products from the reactor are conducted to heat exchanger 11 by a pipe 18 and from thence to a cooler 19 and separator drum 20 from which gas may be released by valved line 21, if desired.

The mixture of oxygen-containing derivatives and unoxidized hydrocarbons may be sent to storage by line 23, if desired, or the mixture may be conducted by line 22 to a suitable separation system. As an example of such a system, rectifying tower 26 and its associated equipment may be described. Valve 25 is preferably provided in line 22 so that the pressure may be reduced before discharge into tower 26. The tower is preferably of the bell cap plate type and is provided with a refluxing coil 27 at the top and a heating coil 28 at its lower end. The oxygen-containing derivatives are obtained from the base of the tower by line 29. Vapor is conducted by pipe 30 to condenser 31 and to separator 32 from which gas may be relieved by line 33. Liquid hydrocarbon is withdrawn from separator 32 and forced by pump 34 through line 3 back to the saturator 1. Fresh hydrocarbon is admitted by line 35.

In the operation of the process, oxygen or a gas rich in oxygen is dissolved in the oil to be oxidized to an extent of about 15% or less, for example 5 to 10 mol %. Preferably the amount of oxygen should be below the explosive limits for the sake of safety. During saturation, pressure may be used to accurately control the absorption of oxygen. The temperature is preferably about atmospheric except in the case where normally gaseous hydrocarbons are being treated, the temperature then being preferably below the normal. Pressure is considerably in excess of atmospheric, for example, above 100 pounds per square inch and preferably from 1000 to 3500 pounds per square inch.

Oxygen is more soluble than nitrogen and the latter may be, to a large extent, rectified out by the use of a saturator of the type described.

In the oxidation step, pressure is within the limits disclosed above and temperature is between 200 and 600° C. The exact temperature depends on the particular hydrocarbon being oxidized and on the particular catalyst, if one is used. The nature of the preferred catalyst is disclosed in the previously noted application. The mixture is rapidly passed through the reactor and the heat of the reaction raises the temperature of the mixture which has been preheated to the desired degree where the reaction proceeds smoothly and rapidly. The reaction mixture should be removed before secondary decomposition takes place to a considerable degree.

The separation of products may be accomplished by distillation at high pressure, for example 40 or 60 atmospheres, or at atmospheric pressure. It is preferable to scrub the hydrocarbon with water or some other suitable solvent for recovery of all of the oxidized derivatives before recirculation.

The separation of the oxidized and unoxidized materials may be made by use of a selective solvent such as is disclosed in Serial No. 279,600, filed May 21, 1928, in the names of P. K. Frolich and J. W. Pugh.

The separators 20 and 32 may be omitted if desired and the diluent nitrogen, together with carbon monoxid and carbon dioxid, may be returned to the saturator from which it will be withdrawn by pipe 8.

Although this process is particularly designed for the oxidation of hydrocarbons, other organic liquids may be oxidized, such as alcohols and aldehydes, and the invention finds application whenever a liquid is to be treated chemically with a reactive gas or gas mixture. Pure hydrocarbons either normally gaseous or liquid may be treated by our method such as propane, butane and octane, or mixtures such as occur in natural gas or natural gas gasoline or higher boiling hydrocarbons, such as naphtha, water white, gas oil and the like.

As an example of our process, air was dissolved in liquid pentane to give about 5.5% oxygen on a molal basis. The mixture was then passed through the reactor under pressure of 2200 pounds per square inch and at a temperature of about 278° C. The product was extracted with aqueous, methyl alcohol and gave the following analysis:

| Product (anhydrous) | Grams of product per litre of pentane |
|---|---|
| Acetaldehyde | 3.84 |
| Acetic acid | 3.47 |
| Acetone | 1.12 |
| Ethanol | 4.52 |
| Propanol | 4.00 |
| Butanol | 1.20 |

Our process is not to be limited by any theory of the mechanism of the reactions nor by any example given merely by way of illustration, but only by the following claims in which it is desired to claim all novelty inherent in the process.

We claim:

1. An improved process for obtaining liquid oxygen-containing derivatives from hydrocarbon by oxidation with an oxidizing gas, comprising dissolving said gas in the hydrocarbon while in a liquid state, passing the mixture rapidly through a reaction zone heated, withdrawing and cooling the product.

2. An improved process for obtaining liquid oxygen-containing derivatives from hydrocarbons by direct oxidation with a gas rich in free oxygen, comprising, dissolving part of the gas in the hydrocarbon while in a liquid state and under pressure in considerable excess of atmospheric, passing the mixture through a reaction zone at a temperature between approximate limits of 200° and 600° C., withdrawing the product, separating oxygen-containing derivatives therefrom and returning unoxidized hydrocarbon to the process.

3. An improved process for obtaining oxygen-containing derivatives from hydrocarbons by direct oxidation with air, comprising, passing air and a hydrocarbon in liquid state in countercurrent relation through a zone of contact while under pressure in excess of 100 pounds per square inch, whereby oxygen is dissolved in the hydrocarbon, withdrawing undissolved nitrogen, passing the mixture comprising hydrocarbon and oxygen while under pressure rapidly through a zone of oxidation maintained at a temperature below 600° C., withdrawing and cooling the product, separating therefrom oxygen-containing derivatives and returning unoxidized hydrocarbon to the contact zone.

4. Process according to claim 3, in which oxidation takes place under pressure of 1000 to 3500 pounds per square inch.

5. Process according to claim 3, in which pressure and temperature conditions are so regulated in the contact zone that oxygen is dissolved in proportion less than ½ mol. per mol. of hydrocarbon.

6. Process according to claim 3, in which pressure between 1000 and 3500 pounds per square inch is maintained during solution of oxygen and oxidation.

JAMES W. PUGH. [L. S.]
ERNEST TAUCH. [L. S.]
THOMAS E. WARREN. [L. S.]